United States Patent
Monden et al.

(10) Patent No.: US 10,816,110 B2
(45) Date of Patent: Oct. 27, 2020

(54) METHOD FOR PRODUCING AN ASSEMBLY FOR A LINE PENETRATION, ASSEMBLY AND METHOD FOR PRODUCTION OF A LINE PENETRATION

(71) Applicant: HILTI AKTIENGESELLSCHAFT, Schaan (LI)

(72) Inventors: Thomas Monden, Stetten (DE); Ulf Mordau, Hattenhofen (DE); Mario Paetow, Igling (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/087,156

(22) PCT Filed: Mar. 14, 2017

(86) PCT No.: PCT/EP2017/055905
§ 371 (c)(1),
(2) Date: Sep. 21, 2018

(87) PCT Pub. No.: WO2017/178176
PCT Pub. Date: Oct. 19, 2017

(65) Prior Publication Data
US 2019/0120409 A1    Apr. 25, 2019

(30) Foreign Application Priority Data
Apr. 12, 2016    (EP) .................................... 16164806

(51) Int. Cl.
*F16L 5/04*    (2006.01)
*A62C 2/06*    (2006.01)
(Continued)

(52) U.S. Cl.
CPC ............... *F16L 5/04* (2013.01); *A62C 2/065* (2013.01); *E04G 9/083* (2013.01); *E04G 15/061* (2013.01);
(Continued)

(58) Field of Classification Search
USPC ........................................................ 52/232
See application file for complete search history.

(56) References Cited

U.S. PATENT DOCUMENTS 3,265,349 A * 8/1966 Hamrick ............... E04G 15/061
249/177
5,058,341 A * 10/1991 Harbeke, Jr. .......... A62C 2/065
52/232
(Continued)

FOREIGN PATENT DOCUMENTS

DE    101 38 726     4/2002
EP    0 635 665      1/1995
EP    0635665 A1 *  1/1995    ............... F16L 5/04

OTHER PUBLICATIONS

International Search Report mailed in PCT/EP2017/055905 dated Jun. 12, 2017, with English translation.
(Continued)

*Primary Examiner* — Brian E Glessner
*Assistant Examiner* — Adam G Barlow
(74) *Attorney, Agent, or Firm* — Grüneberg and Myers PLLC

(57) ABSTRACT

A method can produce an assembly for a line penetration. The method includes: (a) cutting a fire-protection mat forming a fire-protection module to length appropriate for the size of the line penetration, where the fire-protection mat has a flexible carrier element, on at least one end region of which a fire-protection tape of an intumescent material is fastened, (b) bending the fire-protection mat into a circular shape and joining opposite rims of the fire-protection mat to one another via a joining means, so that the fire-protection tape is disposed in a region of an axial end of the circularly shaped fire-protection mat, and (c) fastening at least one mechanical positioning element constructed separately from the fire-protection mat on the fire-protection mat and which
(Continued)

Figure 1:
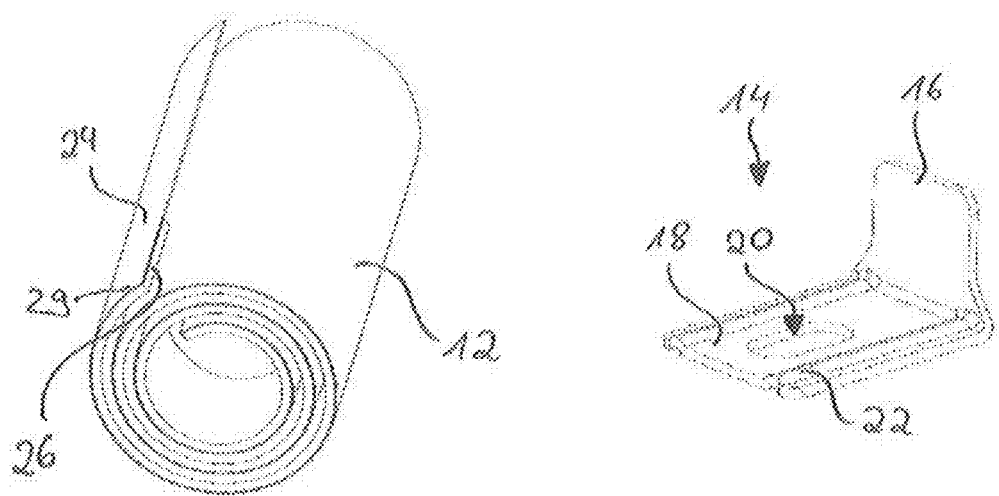

is arranged in such a way that the assembly can be fastened, via the mechanical positioning element, on a wall or on formwork.

20 Claims, 3 Drawing Sheets

(51) Int. Cl.
  *E04G 15/06* (2006.01)
  *H02G 3/04* (2006.01)
  *E04G 9/08* (2006.01)
  *E04G 21/18* (2006.01)
  *H02G 3/22* (2006.01)

(52) U.S. Cl.
  CPC ......... *E04G 21/185* (2013.01); *H02G 3/0412* (2013.01); *H02G 3/22* (2013.01)

(56) References Cited

U.S. PATENT DOCUMENTS

| | | | | |
|---|---|---|---|---|
| 5,103,609 A * | 4/1992 | Thoreson | ............... | A62C 2/065 52/232 |
| 5,155,957 A * | 10/1992 | Robertson | ............. | A62C 2/065 137/360 |
| 5,351,448 A * | 10/1994 | Gohlke | ................. | A62C 2/065 52/1 |
| 5,421,127 A * | 6/1995 | Stefely | ..................... | A62C 2/06 52/1 |
| 5,498,466 A * | 3/1996 | Navarro | ................. | A62C 2/065 428/408 |
| 5,586,739 A * | 12/1996 | Gantner | .................... | F16L 5/04 248/74.1 |
| 5,887,395 A * | 3/1999 | Navarro | ................. | A62C 2/065 428/192 |
| 5,887,396 A * | 3/1999 | Thoreson | ............... | A62C 2/065 52/232 |
| 5,947,159 A * | 9/1999 | Takahashi | ................. | F16L 5/04 138/128 |
| 5,970,670 A * | 10/1999 | Hoffman | ................... | F16L 5/04 52/232 |
| 6,029,412 A * | 2/2000 | Gohlke | .................... | F16L 5/04 137/75 |
| 6,360,502 B1 * | 3/2002 | Stahl, Jr. | ................ | A62C 2/065 52/1 |
| 6,725,615 B1 * | 4/2004 | Porter | ....................... | F16L 5/04 52/232 |
| 7,082,730 B2 * | 8/2006 | Monden | .................... | F16L 5/04 138/161 |
| 8,776,462 B2 * | 7/2014 | Foerg | ..................... | A62C 2/065 52/232 |
| 9,145,987 B2 * | 9/2015 | Muenzenberger | ..... | A62C 2/065 |
| 9,861,843 B2 * | 1/2018 | Paetow | ................... | F16L 3/123 |
| 2004/0149390 A1 * | 8/2004 | Monden | .................... | F16L 5/04 156/391 |
| 2005/0051225 A1 * | 3/2005 | Monden | ................ | E04G 15/061 138/114 |
| 2007/0151183 A1 * | 7/2007 | Stahl, Sr. | .................. | F16L 5/04 52/317 |
| 2011/0180278 A1 * | 7/2011 | Magnay | ................. | A62C 2/065 169/48 |
| 2011/0210222 A1 * | 9/2011 | Van Walraven | ....... | F16M 13/02 248/315 |
| 2012/0207961 A1 * | 8/2012 | Drexl | ..................... | C09K 21/00 428/64.1 |
| 2012/0304979 A1 * | 12/2012 | Munzenberger | ....... | H02G 3/088 126/314 |
| 2013/0097948 A1 * | 4/2013 | Burgess | .................... | E04B 2/00 52/232 |
| 2013/0331489 A1 * | 12/2013 | Kreh | ................... | C09D 5/185 524/100 |
| 2014/0007373 A1 * | 1/2014 | Muenzenberger | ... | H02G 3/0412 16/2.2 |
| 2014/0077043 A1 * | 3/2014 | Foerg | ........................ | F16L 5/04 248/74.1 |
| 2015/0251028 A1 * | 9/2015 | Klein | ................... | H02G 3/0412 277/616 |

OTHER PUBLICATIONS

Written Opinion of the International Searching Authority mailed in PCT/EP2017/055905 dated Jun. 12, 2017.

* cited by examiner

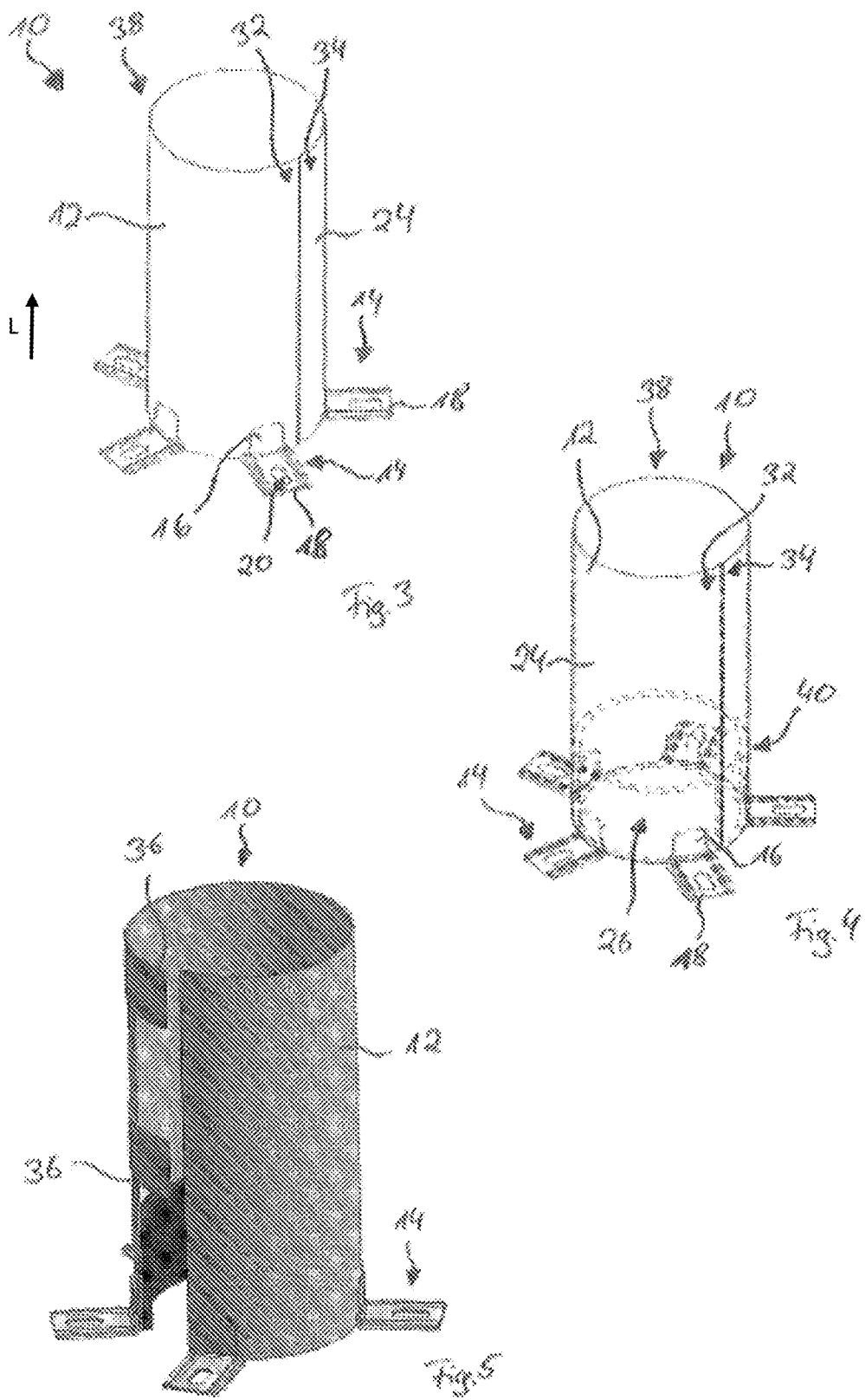

METHOD FOR PRODUCING AN ASSEMBLY FOR A LINE PENETRATION, ASSEMBLY AND METHOD FOR PRODUCTION OF A LINE PENETRATION

This application is a National Stage entry under § 371 of International Application No. PCT/EP2017/055905, filed on Mar. 14, 2017, and claims priority to European Patent Application No. 16164806.8, filed on Apr. 12, 2016.

DESCRIPTION

The invention relates to a method for producing an assembly for a line penetration, to an assembly for a line penetration for casting in place in a building part and to a method for production of a line penetration with an assembly in a building part.

From the prior art, assemblies for fire protection are known that are cast in place in a building part in order thereby to produce a line penetration in a side wall or in a ceiling. In general, such assemblies are known as cast-in-place products.

The assemblies are usually prefabricated, meaning that they have a predefined shape and especially length or diameter.

The disadvantage of these prefabricated building parts is that the flexibility is greatly restricted, whereby the user of the fire-protection products must already take the available prefabricated assemblies into consideration during planning of pipe and cable systems. During the construction and execution phase, it is no longer possible to consider changes to the prefabricated assemblies, and so the fire-protection product would have to be cut to length manually. However, this may lead to damage to the material to be protected.

In order to eliminate this disadvantage, assemblies are further known that have a standard length and can be cut to length or lengthened with other add-on parts.

Thereby at least a certain flexibility is achieved at the point of use. If changes are needed during the construction or execution phase, they can be made at least within a certain scope.

In extreme situations, however, it may continue to occur that the construction phase must be interrupted until new prefabricated building parts having the appropriate size have been purchased and delivered. This delays the construction phase and thus the entire construction project, resulting in higher costs.

Beyond this, so-called pipe collars, which are laid around an existing pipe, are known from the prior art, such as described in DE 101 38 726 A1. However, these pipe collars are not suitable for casting in place in a building part, i.e. as a so-called cast-in-place product.

The object of the invention therefore consists in providing a flexible assembly for a line penetration, with which a line penetration can be produced in simple manner.

The object is solved according to the invention by a method for producing an assembly for a line penetration, in which a fire-protection mat forming a fire-protection module is cut to a length appropriate for the size of the line penetration, wherein the fire-protection mat has a flexible carrier element, on an end region of which a fire-protection tape, which in particular is continuous, of an intumescent material is fastened.

The fire-protection mat is bent into circular shape and the opposite rims of the fire-protection mat are joined to one another via joining means, so that the fire-protection tape is disposed in a region of one axial end of the circularly shaped fire-protection mat. In addition, at least one mechanical positioning element constructed separately from the fire-protection mat is fastened on the fire-protection mat and is arranged in such a way that the assembly can be fastened, via the mechanical positioning element, on a wall or on formwork.

Furthermore, an assembly for a line penetration for casting in place in a building part solves the above object, wherein the assembly is provided with at least one mechanical positioning element, which is arranged in such a way that the assembly can be fastened, via the at least one mechanical positioning element, on a wall or on formwork. The assembly is additionally provided with a substantially cylindrical fire-protection module, which comprises a flexible carrier element, on which a fire-protection tape, which in particular is continuous, of an intumescent material is fastened. The fire-protection module has two opposite rims, which are disposed oppositely in circumferential direction of the fire-protection module and are joined to one another via a joining means.

The basic idea of the invention consists in providing a flexible assembly, which with respect to its size of the line penetration can be produced on site to the requirements, i.e. especially the length and/or diameter of the figure. Accordingly, preselection of the needed fire-protection products no longer has to be done during the planning phase, at least with respect to the size of the assemblies, thus facilitating planning. Accordingly, it is first on site that the fire-protection mat, which forms the fire-protection module, is cut to the appropriate length or size and formed to the fire-protection module. In the process, the carrier element of the fire-protection mat constitutes the sheath for the assembly, so that the assembly has a certain stiffness, which ensures that the assembly maintains its shape while being cast in place in a building part.

By continuous fire-protection tape, a fire-protection tape will be understood that is continuously constructed, i.e. does not have any interruptions. Accordingly, the continuous fire-protection tape is not formed from numerous individual elements spaced apart from one another. Alternatively, i.e. in the case of a discontinuous fire-protection tape, the fire-protection tape may consist of individual strips or segments of elements, which abut one another or may be spaced apart from one another.

These strips in particular are disposed such that, after the two opposite rims of the fire-protection tape have been joined, whereby a line penetration is created, the strips are disposed substantially axially relative to the line penetration. Hereby the construction of the line penetration is simplified.

The mechanical positioning means are preferably inherently rigid, i.e. mechanically stable positioning means. The positioning means ensure mechanical fastening of the assembly to the wall or to formwork, so that the assembly can be durably fastened mechanically to the formwork or to the wall when the line penetration is being produced. For this purpose, the positioning means may be provided with openings, through which the fastening means such as screws, nails or the like may be guided.

One aspect provides that the fire-protection mat is rolled up on a core, from which it is first unrolled. Hereby the fire-protection mat can be transported in compact manner, so that material needed for several assemblies is always available on site.

Rolling-up of the fire-protection mat is possible, since the carrier element is flexible despite its stabilizing effect.

In particular, the opposite rims of the fire-protection module, i.e. the circularly shaped fire-protection mat, are joined to one another via at least one separate joining means. Hereby it is ensured in simple manner that the circularly shaped fire-protection mat retains its shape. The separate joining means may be a separate adhesive strip, a hook-and-loop fastener, a cable tie, a hose clamp or the like.

The at least one adhesive strip is fastened in particular to the side of the carrier element opposite the fire-protection tape. Hereby it is ensured that the intumescent material of the fire-protection tape does not detach the adhesive strips when the intumescent material expands.

According to a further aspect, the at least one positioning element is adhesively bonded with, plugged into, clipped onto the fire-protection module or hooked onto it, especially on the side of the carrier element opposite the fire-protection tape, i.e. usually on the outside. Thus the at least one positioning element can be attached to the fire-protection module in simple manner.

Preferably, a strip element capable of sealing against smoke gas and water and consisting in particular of foam material is fastened to the fire-protection tape. The correspondingly produced assembly therefore effectively prevents smoke and water from passing through the line penetration to reach a neighboring room that is separated by the wall from another room, in which the assembly constitutes the line penetration.

The fire-protection module is in particular shaped in such a way that the opposite rims of the fire-protection module fit tightly together. Accordingly, no overlapping regions exist when the fire-protection mat forming the fire-protection module is circularly shaped. The two rims of the cut-to-length fire-protection mat directly fit tightly together.

One aspect provides that the at least one positioning element is fastened to the side of the carrier element opposite the fire-protection tape. Hereby it is ensured that only the fire-protection tape and optionally the strip element capable of sealing against smoke gas and water is disposed on the inside of the assembly, whereby its functions are not impaired by other building parts, such as the at least one positioning element.

The flexible carrier element is in particular a foil, which preferably consists of a plastic or a metal. Hereby adequate stability of the assembly is achieved, inasmuch as the fire-protection mat is circularly shaped or is formed as the fire-protection module. The needed flexibility, which ensures that the fire-protection mat can be rolled up on a core, can be adjusted in simple manner via the thickness of the carrier element.

Furthermore, the invention relates to a method for the production of a line penetration with an assembly of the type mentioned in the foregoing in a building part, especially a wall or a ceiling of concrete, wherein the assembly is fastened via the at least one positioning element on the wall or formwork and the fire-protection module is surrounded during casting of the building part by the cast material forming the building part, especially by concrete. The assembly for a line penetration is accordingly integrated in the building part while being cast in place therein, wherein the correct positioning of the assembly is ensured in advance via the corresponding mechanical positioning element. Accordingly, the assembly is a so-called cast-in-place fire-protection product.

Figure 2:
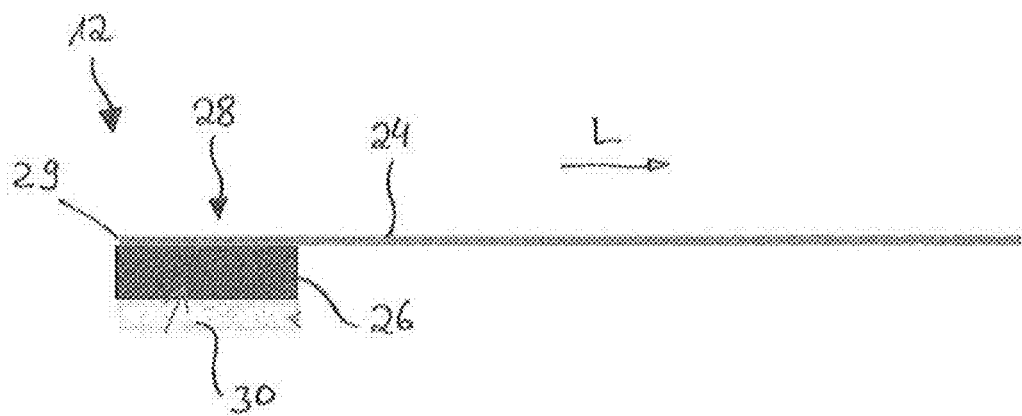
Figure 6:
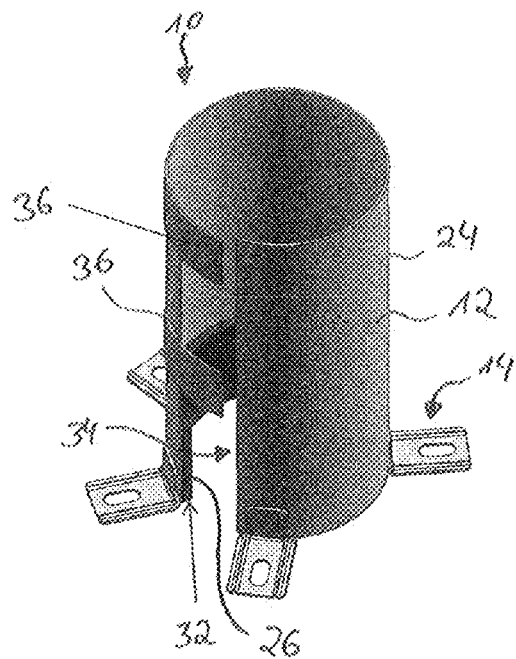
Figure 7:
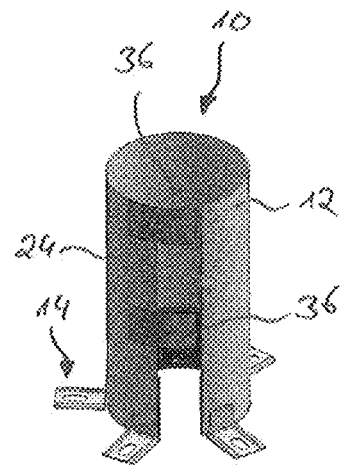
Figure 8:
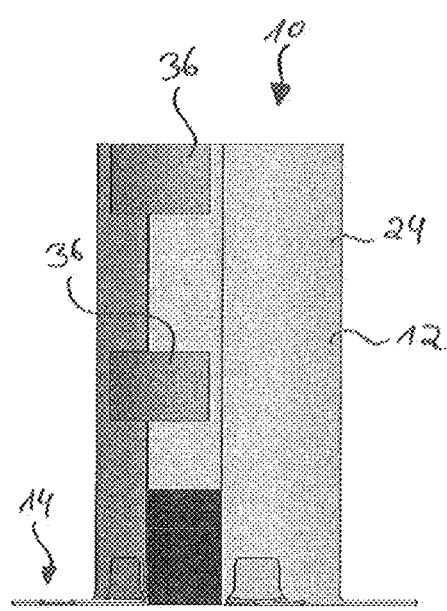

Further advantages and properties of the invention will become apparent from the description hereinafter and from the drawings, to which reference is made. In the drawings:

FIG. 1 shows an overview of the components used for production of the inventive assembly, FIG. 2 shows a sectional diagram of the fire-protection mat used, FIG. 3 shows a perspective view of the inventive assembly according to a first embodiment, FIG. 4 shows a transparent diagram of the assembly from FIG. 2, FIG. 5 shows a perspective diagram of the inventive assembly according to a second embodiment, FIG. 6 shows a further perspective diagram of the inventive assembly according to FIG. 5, FIG. 7 shows a further perspective diagram of the inventive assembly according to FIGS. 5 and 6, FIG. 8 shows a side view of the inventive assembly according to FIGS. 5 to 7.

In FIG. 1, the components are illustrated that are needed for the production of an assembly 10 for a line penetration through a side wall or ceiling in a building, which is illustrated in the produced state in FIG. 3 according to a first embodiment.

The components are a fire-protection mat 12, which in the embodiment shown is rolled up on a core and delivered to the construction site. The structure of fire-protection mat 12 will be explained later with reference to FIG. 2.

A further component of assembly 10 is a mechanical positioning element 14, which is constructed separately from fire-protection mat 12 and in the embodiment shown is constructed as a hook or angle element.

Mechanical positioning element 14 is a mechanically stable element, which is formed from a plastic or a material and accordingly has a corresponding inherent rigidity.

As is apparent from FIG. 1, positioning element 14 has a joining region 16, via which the positioning element can be fastened on fire-protection mat 12, as will also be described hereinafter. Furthermore, positioning element 14 has a positioning portion 18, via which positioning element 14 can be fastened to a wall or to the formwork. For this purpose, an opening 20 through which a fastening means such as a screw or a nail can be guided is provided in positioning portion 18.

Joining region 16 and positioning portion 18 are preferably constructed in one piece together with one another and/or disposed at right angles to one another.

Furthermore, positioning portion 18 may be provided with a reinforcing structure, which is formed by embossings 22, ribs and/or indentations.

With these two components, i.e. fire-protection mat 12 and positioning element 14, it is possible to produce assembly 10 illustrated in FIG. 3, as will also be explained hereinafter.

The structure of fire-protection mat 12 is evident from FIG. 2, since fire-protection mat 12 is shown there in a sectional diagram.

Fire-protection mat 12 is provided with a flexible carrier element 24, which in the embodiment shown consists of a foil. The foil of carrier element 24 is a plastic foil or a metal foil.

On the inside of carrier element 24, a fire-protection tape 26 joined to carrier element 24 is provided. Fire-protection tape 26 is disposed on an end region 28 of carrier element 24, precisely on a rim 29 of carrier element 24, and extends transversely relative to its rim 29 only over a certain subregion of carrier element 24, for example over at most 20% of the axial length L of carrier element 24. However, fire-protection tape 26 runs over the entire width (perpendicular to the drawing plane) of carrier element 24.

It is already apparent from the perspective diagram of the rolled-up fire-protection mat 12 in FIG. 1 that fire-protection tape 26 is disposed only in an end region 28, i.e. on rim 29 of carrier element 24.

In addition, a strip element 30 capable of sealing against smoke gas and water is fastened on fire-protection tape 26 as lamination on the inside of fire-protection tape 26. Strip element 30 may be constructed from a foam material, which is especially well suited for sealing against smoke gas or water.

Fire-protection tape 12 therefore conforms with the requirements for fire-protection approval by the ETA and UL. In addition, imperviousness to smoke gas is assured.

In contrast, fire-protection tape 26 is produced from an intumescent material and preferably is formed continuously or without interruptions on rim 29 of carrier element 24.

With the components shown in FIGS. 1 and 2 and described in detail in the foregoing, assembly 10 shown in FIG. 3 is produced as explained hereinafter.

Fire-protection mat 12 is first unrolled from the core and then appropriately cut to length for the size of the line penetration to be produced.

Then the fire-protection mat 12 is bent into circular shape, so that a substantially cylindrically shaped fire-protection mat 12 is formed and the two rims 32, 34 of cut-to-length fire protection mat 12 are opposite.

Hereby rims 32, 34 of fire-protection mat 12 fit tightly together. In the circularly shaped state of fire-protection mat 12, the two opposite rims 32, 34 are joined to one another via a joining means.

The opposite rims 32, 34 may be joined to one another via an adhesive. Alternatively, the rims 32, 34 fitting tightly together may be welded to one another. Such a joint is shown in the embodiment of FIG. 3.

The joining means may also be at least one separate or several separate adhesive strips 36, as also follows from the second embodiment illustrated in FIGS. 5 to 8.

After fire-protection mat 12 has been bent into circular shape and the opposite rims 32, 34 of fire-protection mat 12 have been joined to one another, a fire-protection module 38 is created.

Flexible carrier element 24 then forms a sheath, which serves for stabilization of the entire assembly 10. Correspondingly, the outside of flexible carrier element 24 forms the outside of assembly 10, while in contrast the space surrounded by it serves as the line penetration when assembly 10 is cast in place.

After fire-protection module 38 has been produced, i.e. fire-protection mat 12 has been bent into circular shape and rims 32, 34 have been joined to one another, the at least one mechanical positioning element 14 constructed separately from fire-protection mat 12 is fastened on circularly shaped fire-protection mat 12 or on fire-protection module 38.

Alternatively, the at least one mechanical positioning element 14 may also be attached firstly to cut-to-length fire-protection mat 12, which is then bent into circular shape in order to construct fire-protection module 38.

In the embodiment shown, several positioning elements 14 are fastened to circularly shaped fire-protection module 38 over the circumference thereof. Hereby assembly 10 can be fastened better to a wall or to formwork.

Positioning elements 14 may be adhesively bonded with, plugged into, clipped onto fire-protection module 38 or hooked onto it. Depending on how positioning elements 14 are fastened on fire-protection module 38, fire-protection mat 12 is provided with corresponding receiving elements for positioning elements 14.

Positioning elements 14 are fastened on the outside of fire-protection module 38, especially of carrier element 24, i.e. on the side of carrier element 24 opposite fire-protection tape 26.

Fire-protection tape 26 as well as strip element 30 are associated with the inner side of fire-protection module 38, while in contrast positioning elements 14 are disposed on the opposite outer side of fire-protection module 38 or of carrier element 24.

It follows in particular from FIG. 4, in which the produced assembly 10 is shown in a transparent representation, that fire-protection tape 26 as well as strip element 30 disposed thereon is disposed only at one axial end 40 of assembly 10, at which positioning elements 14 are also disposed.

This means that the intumescent material of fire-protection tape 26 is disposed in the region via which assembly 10 is fastened on a wall or on formwork. The costs of production of assembly 10, especially of fire-protection mat 12, may be correspondingly reduced, since the relatively expensive intumescent material is used only where an interface is disposed between a room and the wall.

Since fire-protection mat 12 is cut to length on site and positioning elements 14 are attached to fire-protection mat 12 on site, the assembly can be produced in flexible manner on site. No great planning is needed for this purpose and the risk that a delay will occur during the construction phase is minimized.

After assembly 10 has been produced as described in the foregoing, assembly 10 is used to produce a line penetration.

For this purpose, assembly 10 is fastened via positioning elements 14 on an already existing wall or on the formwork for a future wall.

The wall may generally be a side wall or a ceiling.

After assembly 10 has been fastened via positioning elements 14 in an opening on the already existing wall or the formwork for a future wall, then, during casting of the opening on the outside of the assembly or during casting of the building part, i.e. the wall, fire-protection module 38 is surrounded on the outside by the cast material forming the building part, especially by concrete in the case of a concrete wall.

Impervious fire-protection module 38 prevents liquid concrete from passing into the cavity that is surrounded by it and that functions as the line penetration and projects into fire-protection tape 26 as well as strip element 30.

A second embodiment of assembly 10, which differs from the first embodiment to the effect that the two rims 32, 34 of the cut-to-length fire-protection mat 12 are joined to one another via separate adhesive strips 36, is shown in FIGS. 5 to 8. As soon as rims 32, 34 have been joined to one another, they constitute fire-protection module 38 in analogous manner, and so assembly 10 may likewise be used to construct a line penetration.

Accordingly, an assembly 10 is created that can be used for various pipe diameters or line penetrations.

The invention claimed is:

1. An assembly for a line penetration for casting in place in a building part, the assembly comprising:
at least one mechanical positioning element, which is arranged in such a way that the assembly can be fastened, via the at least one mechanical positioning element, on a wall or on formwork, and
a substantially cylindrical fire-protection module, which is provided with a flexible carrier element, on which a fire-protection tape of an intumescent material is fastened at one axial end of the fire-protection module, the fire-protection tape extending over at most 20% of an axial length of the flexible carrier element,
wherein the fire-protection module has two opposite rims, which are opposite in circumferential direction of the fire-protection module and are joined to one another via a joining means.

2. The assembly according to claim 1, wherein
a strip element, capable of sealing against smoke gas and water, is fastened on the fire-protection tape.

3. The assembly according to claim 1, wherein
the opposite rims of the fire-protection module fit tightly together.

4. The assembly according to claim 1, wherein
the opposite rims of the fire-protection module are joined to one another via at least one separate joining means.

5. The assembly according to claim 4, wherein
at least one adhesive strip is fastened to the side of the carrier element opposite the fire-protection tape.

6. The assembly according to claim 1,
the at least one positioning element is fastened to the side of the carrier element opposite the fire-protection tape.

7. The assembly according to claim 1, wherein
the flexible carrier element is a foil.

8. A method for using the assembly of claim 1 for the production of a line penetration in a building part, the method comprising:
fastening the assembly via the at least one positioning element on the wall or formwork,
wherein the fire-protection module is surrounded during casting of the building part by the cast material forming the building part.

9. The assembly according to claim 1, wherein
a strip element comprising a foam material, capable of sealing against smoke gas and water, is fastened on the fire-protection tape.

10. The assembly according to claim 1, wherein
the opposite rims of the fire-protection module are joined to one another via at least one separate joining means that comprises a separate adhesive strip.

11. The assembly according to claim 1, wherein the flexible carrier element is a foil, which comprises a plastic or a metal.

12. A method for producing the assembly as claimed in claim 1 for a line penetration, the method comprising:
(a) cutting a fire-protection mat forming the fire-protection module to length appropriate for the size of the line penetration, wherein the fire-protection mat has the flexible carrier element, on at least one end region of which the fire-protection tape is fastened,
(b) bending the fire-protection mat into a circular shape and joining opposite rims of the fire-protection mat to one another via the joining means, so that the fire-protection tape is disposed in a region of an axial end of the circularly shaped fire-protection mat, and
(c) fastening the at least one mechanical positioning element constructed separately from the fire-protection mat on the fire-protection mat and which is arranged in such a way that the assembly can be fastened, via the mechanical positioning element, on a wall or on formwork.

13. The method according to claim 12, wherein
the fire-protection mat is rolled up on a core, from which it is first unrolled.

14. The method according to claim 12, wherein
opposite rims of the fire-protection module are joined to one another via at least one separate joining means.

15. The method according to claim 12, wherein
the at least one positioning element is fastened by a method selected from the group consisting of adhesively bonded with, plugged into, clipped onto the fire-protection module, and hooked onto the fire-protection module.

16. The method according to claim 12, wherein
a strip element, capable of sealing against smoke gas and water, is fastened onto the fire-protection tape.

17. The method according to claim 12, wherein the fire-protection tape is continuous.

18. The method according to claim 12, wherein
opposite rims of the fire-protection module are joined to one another via at least one separate joining means that comprises a separate adhesive strip.

19. The method according to claim 12, wherein
the at least one positioning element is fastened by a method selected from the group consisting of adhesively bonded with, plugged into, clipped onto the fire-protection module, and hooked onto the fire-protection module on the side of the carrier element opposite the fire-protection tape.

20. The method according to claim 12, wherein
a strip element comprising a foam material, capable of sealing against smoke gas and water, is fastened onto the fire-protection tape.

* * * * *